Feb. 3, 1931.  I. S. JORDAN  1,791,316

FISH BAIT OR LURE

Filed Dec. 27, 1927

INVENTOR
Ira S. Jordon
BY Chappell & Earl
ATTORNEYS

Patented Feb. 3, 1931

1,791,316

UNITED STATES PATENT OFFICE

IRA S. JORDAN, OF PENSACOLA, FLORIDA

FISH BAIT OR LURE

Application filed December 27, 1927. Serial No. 242,602.

The main objects of this invention are:

First, to provide an improved fish bait or lure having a movement in the water simulating a live bait, such as a shrimp.

Second, to provide an improved fish bait or lure having a movement in the water which is very effective in attracting fish.

Objects relating to details and economies of my invention will appear from the description to follow. The invention is defined and pointed out in the claims.

A structure which is a preferred embodiment of my invention is illustrated in the accompanying drawing, forming a part of this specification, in which.

In the drawing similar reference characters refer to similar parts throughout the several views.

Figure 1:
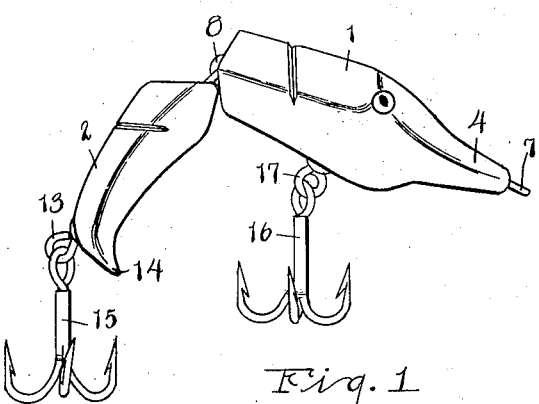
Fig. 1 is a side elevation of my improved bait in approximately the position which it assumes when suspended in water.
Figure 3:
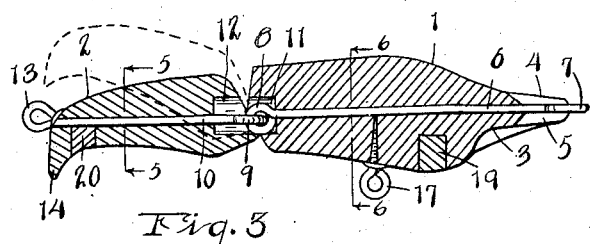
Fig. 3 is a longitudinal section on a line corresponding to line 3—3 of Figs. 2, 4, 5 and 6, the parts being shown in full lines for convenience in illustration, the hooks being omitted, one position of the rear body member being shown in full lines and in another position by dotted lines.
Figure 4:
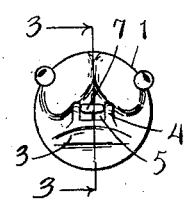
Fig. 4 is a front view of the body members in approximate alignment.
Figure 2:
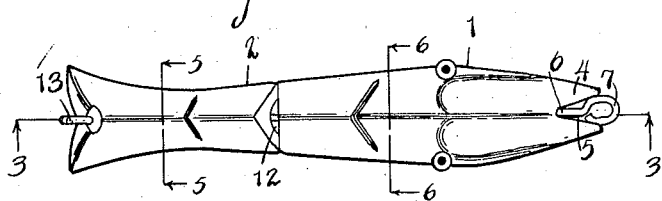
Fig. 2 is a top view with the body members in approximate alignment.
Figure 5:
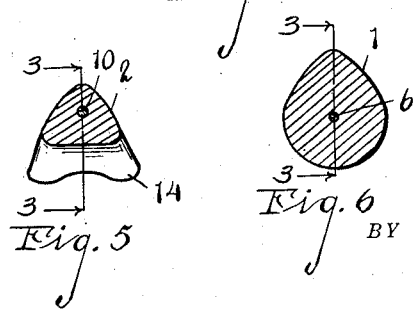
Fig. 5 is a cross section on line 5—5 of Figs. 2 and 3.
Figure 6:
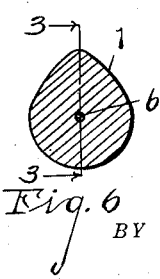
Fig. 6 is a cross section on line 6—6 of Figs. 2 and 3.

In the embodiment illustrated my improved bait comprises a front body member 1 and a rear body member 2 joined for pivotal or swinging movement relative to each other. The body members, in the structure illustrated, are of a general outline to represent a shrimp.

The front body member has an undercut portion on its front end providing an upwardly and forwardly inclined under surface 3, preferably of upwardly curved cross section. The nose portion 4 has a longitudinal slit therein which opens centrally to this undercut surface 3.

The rod 6 is arranged longitudinally through the front body member and is provided with an eye 7 at its front end for the attachment of the line, the rod being in alinement with the nose; that is, it lies in the slit thereof. At its rear end the rod 6 is provided with an eye 8 engaging the eye 9 on the rod 10 arranged longitudinally through the rear body member. The body members at their adjacent ends are provided with recesses 11 and 12 to receive the eyes 8 and 9, thereby permitting a close coupling of the body members. At its rear end the rod 10 is provided with a hook attaching eye 13.

The rear body member has a downwardly curved flared tail portion 14. A rear hook 15 is attached to the eye 13 while a hook 16 is attached to the front body member by means of a screw eye 17.

A weight 19 is inserted in a bore in the under side of the front body member, the weight being arranged in front of the longitudinal center of the front body member so that it tends to tilt the front end downwardly. The rear body member has a weight 20 at its rear end, this weight being inserted in a bore from the underside of the body member. The rear hook 15 also constitutes a weight for the rear body member.

With the centers of gravity of the body members adjacent the outer ends thereof, when the bait is suspended in water it assumes a position similar to that shown in Fig. 1, the outer ends falling downward. A pull on the line causes the rear portion of the body to flip or swing upwardly, the body straightening out more or less according to the speed with which it is propelled, a series of pulls imparting a swimming action to the bait.

The upwardly and forwardly inclined surface 3 at the front of the bait tends to lift the front end of the bait as it is drawn through the water. Owing to the slit in the nose and the upwardly inclined surface a pull on the line tends to lift the forward end of the bait, while the trailing of the rear portion of the body and its shape raises it. A sharp pull or jerk results in a shrimp-like motion. The swimming action of the bait is mainly in a vertical plane and results from intermittent pulls on the line, allowing the bait to assume or partially assume the angled relation of Fig. 1. The buoyancy of the jointed end of the body maintains the bait in an upright position even when it rests upon the bottom or bed of the lake or stream.

Having thus described my invention what I claim as new and desire to secure by Letters Patent is:

1. A fish bait or lure comprising front and rear body members, the front body member having an upwardly and forwardly inclined under surface at its front end, the rear end of the rear body member being flared laterally and curved downwardly, rods disposed longitudinally through said body members and provided with eyes at their ends, the eyes at the adjacent ends of said body members engaging providing a pivot connection for said body members, the eye at the front end of the front rod constituting a line attaching means, the eye at the rear end of the rear rod constituting a hook attaching means, and weights disposed at the front and rear ends respectively of said front and rear body members whereby when in the water said body members will assume an oppositely inclined position.

2. A fish bait or lure comprising articulated front and rear body members, the front body member having an upwardly and forwardly inclined under surface at its front end, the rear end of the rear body member being flared laterally and curved downwardly, and weights disposed at the front and rear ends respectively of said front and rear body members whereby when in the water the articulated ends of said body members will be lifted above their outer ends.

3. In a fish bait or lure, the combination of a body comprising front and rear articulated body members, the front body member having an upwardly and forwardly inclined under surface at its front end, the rear body member having a downwardly projecting tail portion, said body members being weighted so that when suspended in water they assume an oppositely inclined position, the front body member being provided with line attaching means at its front end, a hook attached to the under side of the front body member, and a second hook attached to the rear end of the rear body member.

4. In a fish bait or lure, the combination of a body comprising front and rear articulated body members, the rear body member having a downwardly projecting tail portion, said body members being weighted so that when suspended in water they assume an oppositely inclined position, the front body member being provided with line attaching means at its front end and a recess below said line attaching means.

5. A fish bait or lure comprising body members articulated to permit vertical swinging movement relative to each other, said body members being weighted so that they assume an angle to each other when in water, the front member being provided with line attaching means, and a hook carried by one of the members.

In witness whereof I have hereunto set my hand.

IRA S. JORDAN.